(12) United States Patent
Chiodini

(10) Patent No.: US 11,321,642 B1
(45) Date of Patent: May 3, 2022

(54) SYSTEM, METHOD, AND COMPUTER PROGRAM PRODUCT FOR DECENTRALIZED RIDESHARE SERVICE NETWORK

(71) Applicant: Jason M Chiodini, San Diego, CA (US)

(72) Inventor: Jason M Chiodini, San Diego, CA (US)

(73) Assignee: FARE.IO INC., San Diego, CA (US)

(*) Notice: Subject to any disclaimer, the term of this patent is extended or adjusted under 35 U.S.C. 154(b) by 272 days.

(21) Appl. No.: 16/534,863

(22) Filed: Aug. 7, 2019

Related U.S. Application Data

(60) Provisional application No. 62/715,567, filed on Aug. 7, 2018.

(51) Int. Cl.

| | |
|---|---|
| *G06Q 10/02* | (2012.01) |
| *H04L 29/06* | (2006.01) |
| *H04L 67/306* | (2022.01) |
| *G06F 3/0482* | (2013.01) |
| *G06Q 10/06* | (2012.01) |
| *G06Q 50/30* | (2012.01) |
| *G06Q 20/22* | (2012.01) |
| *H04L 67/10* | (2022.01) |
| *H04L 67/104* | (2022.01) |

(52) U.S. Cl.
CPC ........... *G06Q 10/02* (2013.01); *G06F 3/0482* (2013.01); *G06Q 10/06311* (2013.01); *G06Q 20/223* (2013.01); *G06Q 50/30* (2013.01); *H04L 67/306* (2013.01); *H04L 67/10* (2013.01); *H04L 67/104* (2013.01)

(58) Field of Classification Search
CPC ......... H04L 67/12; H04L 67/16; H04L 12/14; H04L 67/306; H04L 67/10; H04L 67/104; G06Q 10/02; G06Q 50/30; G06Q 10/06311; G06Q 20/223; G06F 3/0482
See application file for complete search history.

(56) References Cited

U.S. PATENT DOCUMENTS

| | | | |
|---|---|---|---|
| 2014/0229258 A1* | 8/2014 | Seriani | G06Q 10/08345 705/14.23 |
| 2016/0132792 A1* | 5/2016 | Ros | G06F 3/0484 705/5 |
| 2016/0364678 A1* | 12/2016 | Cao | G06Q 50/30 |
| 2018/0342035 A1* | 11/2018 | Sweeney | G06Q 50/30 |
| 2019/0251762 A1* | 8/2019 | Mannan | G07C 5/008 |
| 2019/0339087 A1* | 11/2019 | Jindal | G06N 3/088 |
| 2019/0370922 A1* | 12/2019 | Asghari | G06Q 50/30 |

* cited by examiner

*Primary Examiner* — Jungwon Chang
(74) *Attorney, Agent, or Firm* — Plager Schack LLP; Mark H. Plager; Alexis J. Saenz

(57) ABSTRACT

A rideshare service platform is configured with a decentralized computing network system in a peer-to-peer connection. The decentralized computing network system locates driver users available for a rideshare service in response to a rider user request. Driver users set their own rates and offer individualized rideshare features through a user interface that is configured for the driver to input user defined features including rates, distances, and other miscellaneous features that may be wanted by a rider. Some embodiments are configured to generate multiple driver pre-set profiles for a driver user that the driver can select for example, at different times of rideshare demand.

7 Claims, 6 Drawing Sheets

SYSTEM, METHOD, AND COMPUTER PROGRAM PRODUCT FOR DECENTRALIZED RIDESHARE SERVICE NETWORK

CROSS REFERENCE TO RELATED APPLICATIONS

This application claims benefit under 35 U. S.C. § 119(e) of U.S. Provisional Application having Ser. No. 62/715,567 filed Aug. 7, 2018, which are hereby incorporated by reference in their entirety.

BACKGROUND

Conventional rideshare platforms use a centralized host platform which automatically controls the amount of fees offered for the service. The rider must select from one of many drivers with a fee common to each of the drivers. Exiting services take advantage of the drivers and do not account for the total cost of ownership of vehicle, time, and any/all associations with a ride service business. Existing systems set ride service rates and take a percentage of the fees from the drivers. The drivers are not in control and cannot earn a living wage.

For example, existing systems take approximately 30% from every ride given which in turn does not meet minimum wage in any state. Existing services take advantage of the drivers and do not account for total cost of ownership of vehicle, time, and any/all associations with a ride service business.

Drivers are protesting globally because existing systems are unprofitable which leads to taking money from drivers. These systems do not allow drivers to operate freely to meet demand and have enslaved drivers with corrupt incentives. It's a vicious cycle that in the end causes grief, hatred and unsafe operations for both drivers and riders.

As can be seen there is a need for a system that allows drivers control of their service.

SUMMARY

In one aspect, a computer program product is disclosed for a decentralized rideshare service system. The computer program product comprises a non-transitory computer readable storage medium having computer readable program code embodied therewith. The computer readable program code is configured to, when executed by a computer processing unit: generate a driver side user interface (UI) on a first mobile computing device, for a first driver user, wherein the driver side UI is configured to receive user defined rates for offering a rideshare service from the first driver user; generate a rider side UI on a second mobile computing device, wherein the first mobile computing device and the second mobile computing device are connected together wirelessly through a decentralized computing network system in a peer-to-peer connection, wherein the decentralized computing network system includes a plurality of mobile computing devices including copies of the computer program product; receive, from the second mobile computing device, a rideshare request from a rider user; locate one or more available driver users through the decentralized computing network system; display a list of profiles of the one or more available driver users to the rider user, including a profile of the first driver user showing the first driver user's user defined rates; and receive a selection, through the rider side UI screen on the second mobile computing device, of the one or more available driver users.

In another aspect, a method for a decentralized rideshare service system is disclosed, comprising: generate a driver side user interface (UI) on a first mobile computing device, for a first driver user, wherein the driver side UI is configured to receive user defined rates for offering a rideshare service from the first driver user; generating a rider side UI on a second mobile computing device, wherein the first mobile computing device and the second mobile computing device are connected together wirelessly through a decentralized computing network system in a peer-to-peer connection, wherein the decentralized computing network system includes a plurality of mobile computing devices including copies of the computer program product; receiving, from the second mobile computing device, a rideshare request from a rider user; locating one or more available driver users through the decentralized computing network system; displaying a list of profiles of the one or more available driver users to the rider user, including a profile of the first driver user showing the first driver user's user defined rates; and receiving a selection, through the rider side UI screen on the second mobile computing device, of the one or more available driver users.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology address the problems associated with the limitations for drivers and riders in a rideshare service platform. Conventional rideshare services are operated through a centralized host, which dictates the rates charged for a ride. Neither the driver nor the user has any input into the rideshare rate. Thus, as may be appreciated both the driver and rider are generally shortchanged by their participation in the conventional platform. Drivers are not compensated adequately for the costs associated with operating a vehicle (which may include for example, use of fuel, insurance, wear and tear, and maintenance) in addition to their time. Riders are commonly subject to price gouging at certain times which generally benefits the host platform more than the drivers. In addition, little separates one driver from another to a requesting user, other than review ratings and vehicle type. Review ratings are vulnerable to subjective feedback and sometimes are inflated or deflated by certain tactics. Embodiments disclosed below provide a rideshare service platform that is configured with a decentralized computing network system in a peer-to-peer connection. As will be appreciated, the peer-to-peer connection allows users on both side of the service more flexibility in choices available as well as a truer free market service. The decentralized computing network system locates driver users available for a rideshare service in response to a rider user request. Driver users set their own rates and offer individualized rideshare features through a user interface that is configured for the driver to input user defined features including rates, distances, and other miscellaneous features that may be wanted by a rider. Some embodiments are configured to generate multiple driver pre-set profiles for a driver user that the driver can select for example, at different times of rideshare demand.

Figure 1:
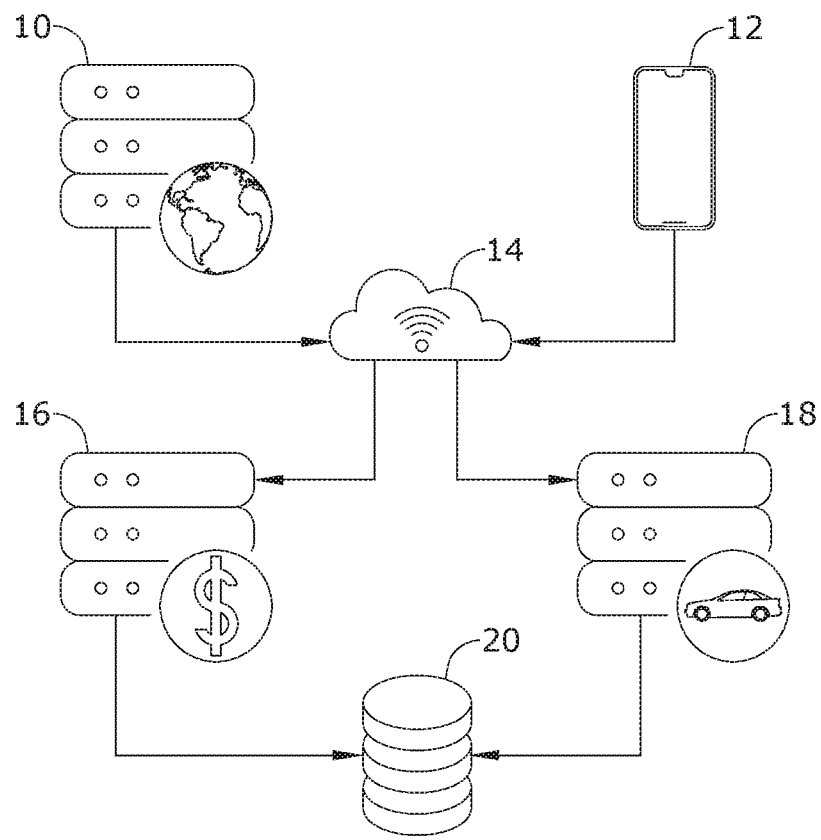
FIG. 1 is a block diagram of a system for a decentralized ride share platform according to an embodiment of the subject technology.

Referring now to FIG. 1, a system for a decentralized rideshare platform is shown according to an exemplary embodiment. The system generally includes a rider user accessing the system through a mobile computing device 12. The mobile computing device 12 is shown as a smart phone but can be a number of other telecommunications enabled devices as explained in more detail below with respect to FIG. 9. The rider user is generally connected to driver users through a wireless network connection 14. The driver users may be connected to the network 14 through their own respective mobile computing devices. The wireless network connection 14 may be through a cloud service or other network but is generally a decentralized network of computing devices as explained in more detail below with respect to FIG. 8. In some embodiments, there may be a web-based server 10 which provides user registration and access to the service. Some embodiments may include a payment server 16 which receives direct payment for rideshare services from a rider user and may provide payment services to a driver user. The system may include a database 20 which generally stores user information, records of ride services, and driver locations.

Figure 2:
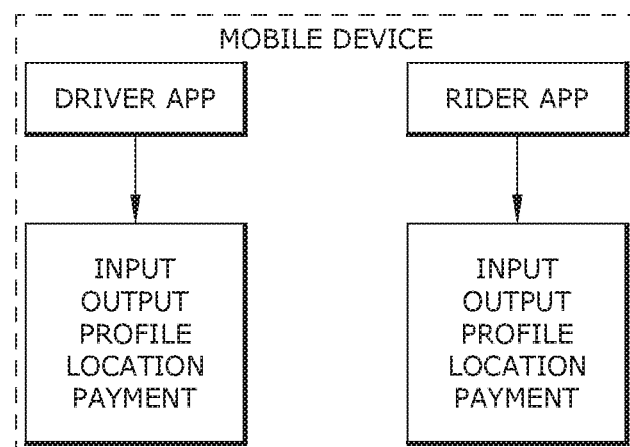
FIG. 2 is a block diagram of a mobile computing device with an integrated mobile software application for a decentralized ride share platform according to an embodiment of the subject technology.

Referring now to FIG. 2, a software application for peer-to-peer rideshare services through a mobile computing device is shown according to an exemplary embodiment. The software application may include user interfaces which may be different for driver users than it is for rider users. Some embodiments may have a singular application which has an option to select an interface as either a driver or as a user. Respective user types may generally input data including for example, their profile, current location (which may be automatically extracted from GPS location integrated within the mobile computing device), and payment information.

Figures 3, 4:
FIG. 3 is a front view of a mobile computing device showing a screen shot of a loading page for a mobile software application for a decentralized ride share platform according to an embodiment of the subject technology.
FIG. 4 is a front view of a mobile computing device showing a user interface in the mobile software application of FIG. 3, for a driver user to input user defined rideshare offerings according to an embodiment of the subject technology.

Referring ow to FIG. 3, an example of a UI loading screen for the software embodiment is shown. In some embodiments, the user's current location may be automatically detected upon opening the app.

Referring now to FIG. 4, a UI for a driver user is shown according to an exemplary embodiment. The driver's UI may include input fields which receive user defined metadata associated with the driver's rideshare service offerings. For example, the driver may set their own fare associated rates (which may be set regardless of ride request volume). As may be appreciated, this feature is unconventional because typically the rideshare host platform sets rates based on a profitable algorithm. Other fields may be configured to receive other driver features including for example, a vehicle type (which may include make/model) and/or user defined tags which may describe features or limitations of riders preferences available for a ride. For example, tags may include driver gender (which some riders may prefer out of a perceived safety), whether the vehicle or service is pet friendly (which is another unconventional feature unavailable in current platforms which at best require a ride user to communicate with a driver on pet policy at pick-up or by messaging), whether smoking is allowed or prohibited, and other amenities that may be available. From a rider's UI, the app may include a filter feature which may include locating drivers which may have one or more features requested by the rider. For example, a rider may need wheelchair friendly vehicle as will be detailed below, once the rider includes any tags for filtering, the system may locate one or more available drivers which offer one or more of the features based on their profile settings.

Figure 5:
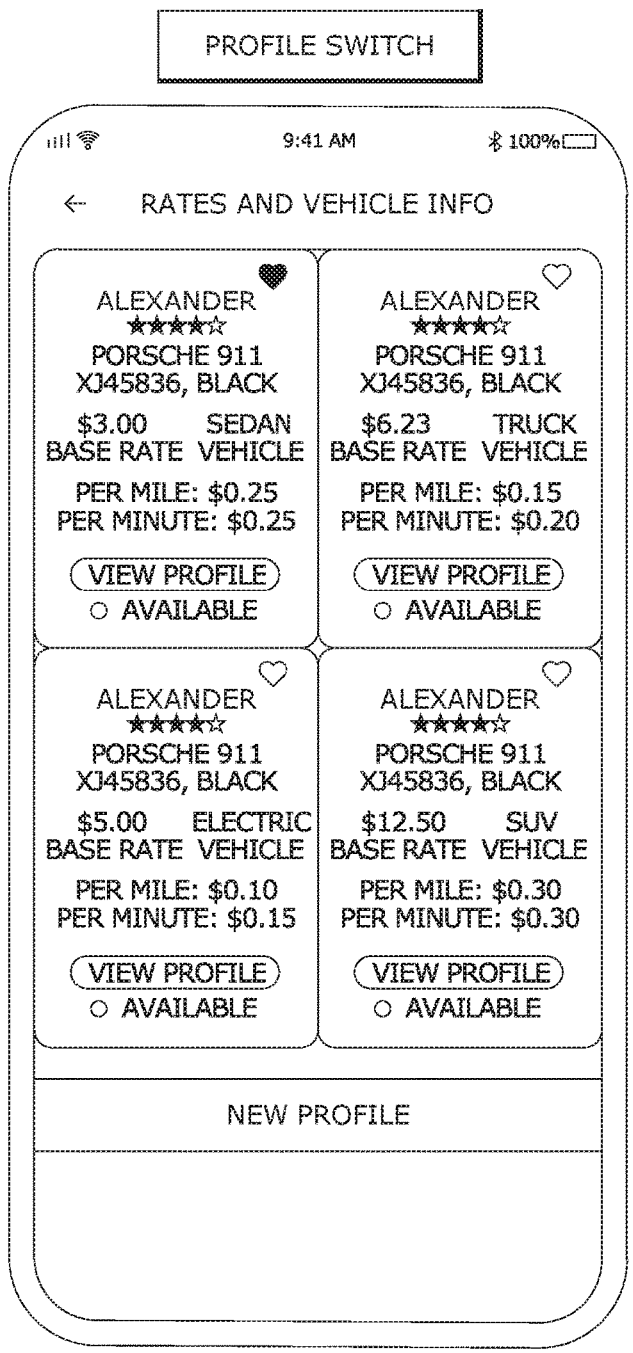
FIG. 5 is a front view of a mobile computing device showing another user interface in the mobile software application of FIG. 3, for a driver user profile page including multiple user defined pre-set driver profiles according to an embodiment of the subject technology.

Referring now to FIG. 5, a driver UI shows a screenshot for a user defined set of profiles is shown according to an exemplary embodiment. A driver user may generate a plurality of pre-set profiles which may offer different rates and features. One or more of the profiles may be selectably enabled by the driver to indicate availability. Conventional rideshare platforms only offer a single profile per user account because the platform controls variables. However, as will be appreciated, the driver user is on control of variable under embodiments of the subject system. For example, a first profile may be for a first vehicle and may offer rides based on a first user defined rate. Depending on the vehicle type, the driver may offer a first set of tags which may be available. For example, a larger vehicle may offer room for more passengers. A smaller vehicle may offer room for only a single passenger. The first profile may be configured as the driver's standard profile. Yet the driver may generate a second pre-set profile which may be selectable for availability when volume is slow and the driver wants to automatically offer a lower, more competitive rate to stimulate more business. Another profile may be generated when demand is high and the driver wants to offer services at a higher rate. Another profile may be generated for a different vehicle, or for a different distance of availability, or other settings which may change depending on the time of day, demand for services, or situation of the driver. It will be understood that the profiles shown are examples only. While the same make and model was shown for each profile, the profiles may be generated to describe different vehicles. In addition, the vehicle type setting shown may be changed to more accurately describe the vehicle make/model of the profile.

Figure 6:
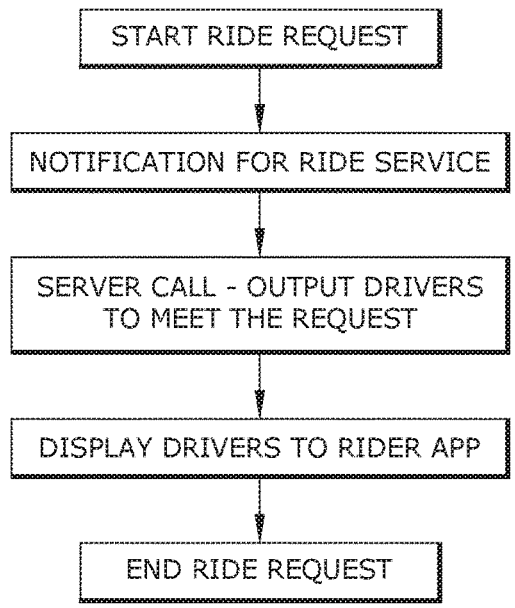
FIG. 6 is a flowchart of a method of a ride request notification to drivers according to an embodiment of the subject technology.

Referring now to FIG. 6, a method of administering a ride request is shown according to an exemplary embodiment. The method generally includes a ride user starting a ride service request. A notification for the request may be sent to the system. The host platform may access its database of drivers to locate available drivers to meet the request. Located drivers may be displayed to the ride requestor through their app UI. The method may then end the request process.

Figure 7:
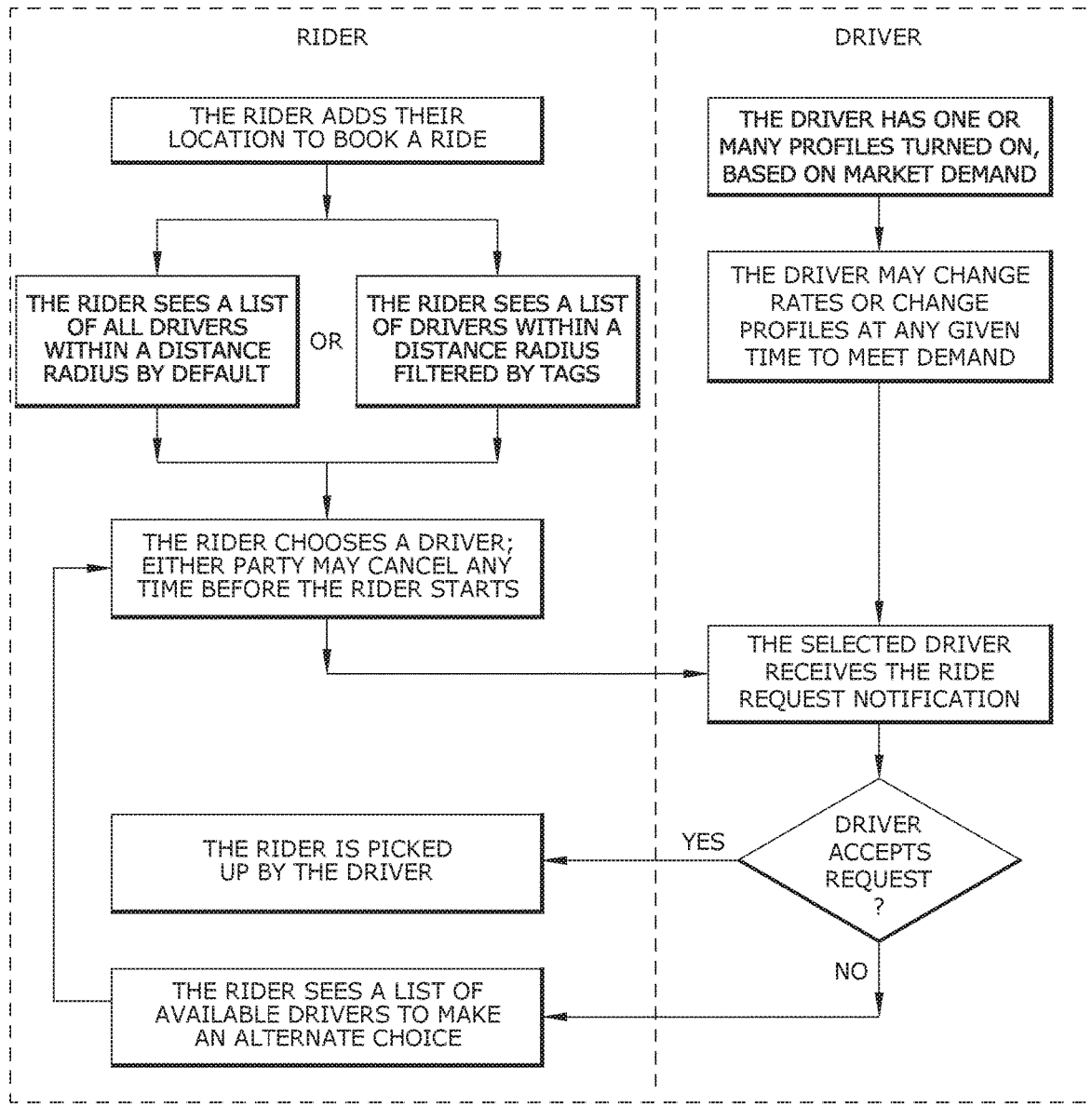
FIG. 7 is a flowchart of a method of a ride request and driver acceptance according to an embodiment of the subject technology.

Referring now to FIG. 7 a method of a ride request and driver acceptance is shown according to an exemplary embodiment. A rider user and a driver user may interface with the system through their respective app UIs. As shown, some actions of the rider user and the driver user may occur concurrently or may occur at different times. From the rider user's perspective, the rider requests a ride and may input their current location. The location may in some embodiments, be automatically loaded into the request. From the driver user's perspective, the method may include one or more pre-set user defined profiles indicating availability. In some embodiments, the driver's UI is configured for spontaneous or "on-the-fly" changes to the user's profile(s). The system may locate drivers which match up with the user's location. In some embodiments, drivers may be listed based on a default distance to the rider. The default distance may be set by the rider in a user preference setting. In some embodiments, drivers may be listed based on a distance setting according to a rider filter setting which matches a driver's filter setting for distance. The rider user may also be presented with other metadata associated with listed drivers that may assist the rider with selecting one driver over another. The metadata may include driver features or amenities available with the ride service offered. The rider selects a driver from the list and the selected driver is notified. The system may first check if the driver accepts the ride request. The driver may decline the request for example because of multiple simultaneous requests. If the driver accepts the request, the driver picks up the ride requestor. if the driver declines, the requestor may be a refreshed list of available drivers to make an alternate selection.

Figure 8:
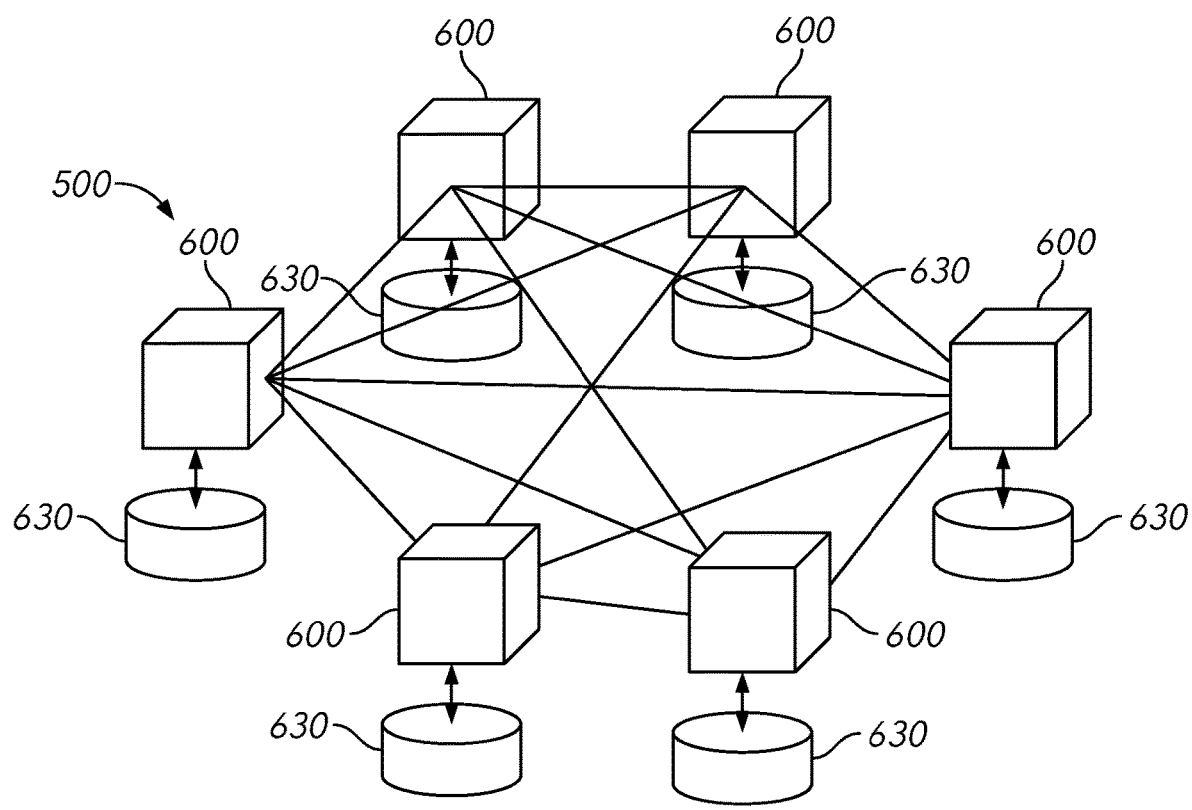
FIG. 8 is a block diagram of a decentralized computing network system according to an embodiment of the subject technology.

Referring now to FIG. 8, a decentralized network 500 of computing devices is shown according to an exemplary embodiment. The decentralized network 500 may generally comprise a plurality of computing devices 600, with each device including a database 630 storing data including copies of the software embodiments for offering rideshare services. Multiple database repositories 630 of each computing device 600 is spread across several nodes (computing devices 600) on a peer-to-peer network, where each computing device 600 may be accessed by a host server to match ride requestors with available drivers. The decentralized network may be distributed, which means requests and/or transactions may be seen and displayed among a plurality of participants (Peer-to-peer) without a central intermediary dictating terms. The set of rules and terms for a rideshare service are dictated by the members of the and not by a central authority.

Figure 9:
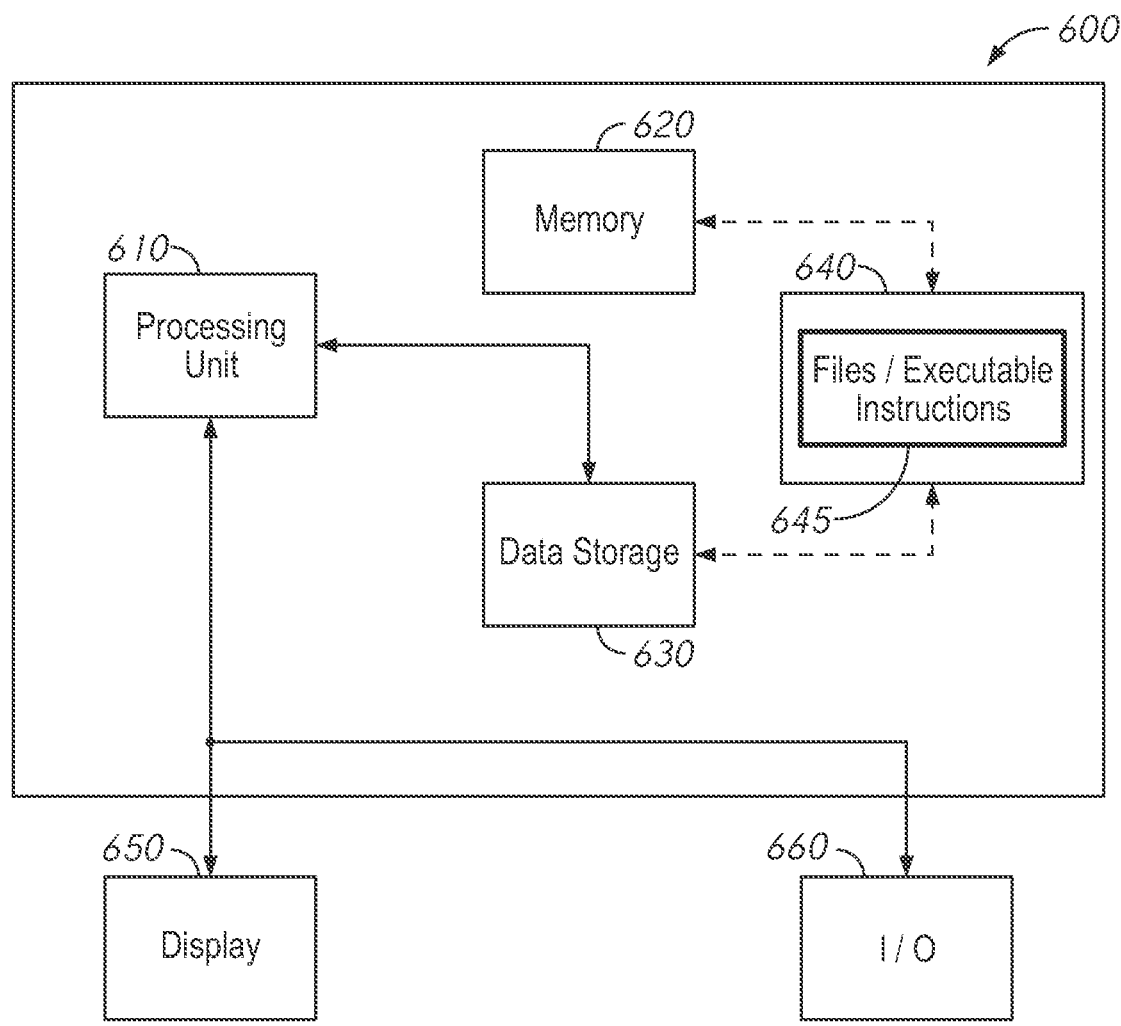
FIG. 9 is a block diagram of a computer system/server according to an embodiment of the subject technology.

Referring now to FIG. 9, details of a computing device 600 are shown according to an exemplary embodiment. The computing device 600 may be for example, a computer system or a computer server hosting access to the user interfaces from the rider and driver side interfaces. as a host server, the computing device 600 may also coordinate ride requests, locate available drivers by checking databases and current locations, and forward acceptance or declines in service from a rider or driver to the other party. In the role of a user device, the computing device 600 is generally not a server but may instead be a mobile computing device (for example, a smart phone, smart wearable devices (glasses, jewelry, watches, ear wear, etc.). In some embodiments, the computing device 600 may be a desktop computer, tablet or laptop computers, all-in-one computer stations, or programmable electronics (for example home-based smart system).

The components of the computing device 600, may include, but are not limited to, one or more processors or processing units 610, a system memory 620, data storage 630, a computer program product 640 having a set of program modules 645 including files and executable instructions, and a bus system that couples various system components including the system memory 620 to the processor(s) 610. The computing device 600 may include an electronic display 650 which may in some embodiments be configured for tactile response as in a touch screen display. User input into the display 650 may be registered at the processor 610 and processed accordingly.

The computing device 600 may be described in the general context of computer system executable instructions, such as the program modules 645 which represent a software embodiment of the system and processes described generally above. The program modules 645 generally carry out the functions and/or methodologies of embodiments as described above. The computing device 600 may typically include a variety of computer system readable media. Such media could be chosen from any available media that is accessible by the computing device 600, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 620 could include one or more computer system readable media in the form of volatile memory, such as a random-access memory (RAM) and/or a cache memory. By way of example only, the data storage system 630 may read from and write to a non-removable, non-volatile magnetic media device. The data storage system may also sometimes be referred to as a "database" 630 and may represent an entirely hardware-based storage, an entirely software-based storage, or both. The system memory 620 and/or data storage system 630 may include at least one program product 640 having a set (e.g., at least one) of program modules 645 that are configured to carry out the functions of embodiments of the invention in the form of computer executable instructions.

The computing device 600 may communicate with one or more external devices. Other devices may enable the computing device 600 to communicate with one or more other computing devices, either by hardwire or wirelessly. Such communication can occur via Input/Output (I/O) interfaces/ports 660. The computing device 600, through the I/O interface/ports 660, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 600 may be a cloud computing node connected to a cloud computing network which may be for example represented by the network shown in FIG. 8. The computing device 600 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 650 which may be controlled via direct contact with the display 650 or via the I/O interfaces 660 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 610 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for a decentralized rideshare service system, the computer program product comprising a non-transitory computer readable storage medium having computer readable program code embodied thereon, the computer readable program code being configured to, when executed by a computer processing unit:
   generate a driver side user interface (UI) on a first mobile computing device, for a first driver user, wherein the driver side UI is configured to receive:
   user defined rates for offering a rideshare service from the first driver user and user defined tags of amenities associated with the rideshare service from the first driver user;
   generate in the driver side user interface (UI), a screen for entry of a plurality of pre-set user defined rideshare offering profiles associated with the first driver user, wherein the plurality of pre-set user defined rideshare offering profiles include a rideshare rate that is different from a first pre-set user defined rideshare offering profile to a second pre-set user defined rideshare offering;
   generate a rider side UI on a second mobile computing device, wherein the first mobile computing device and the second mobile computing device are connected together wirelessly through a decentralized computing network system in a peer-to-peer connection, wherein the decentralized computing network system includes a plurality of mobile computing devices including copies of the computer program product and individual database repositories storing rules and terms for a rideshare without a central intermediary dictating the terms;
   receive, from the second mobile computing device, a rideshare request from a rider user;
   locate one or more available driver users through the decentralized computing network system;
   display a list of profiles of the one or more available driver users to the rider user, including a profile of the first driver user showing the first driver user's user defined rates; and
   receive a selection, through the rider side UI screen on the second mobile computing device, of the one or more available driver users.

2. The computer program product of claim 1, wherein the list of profiles of the one or more available driver users is displayed based on driver users within a default distance from the rider user.

3. The computer program product of claim 1, wherein the rider side UI includes with a filter feature configured to filter out available driver users based the user defined amenities.

4. The computer program product of claim 1, wherein the user defined tags include a maximum distance between driver user and the rider user for driver availability.

5. The computer program product of claim 1, wherein the pre-set user defined rideshare offering profiles are selectable by the first driver user to indicate availability of a rideshare service under terms of a selected one of the pre-set user defined rideshare offering profiles.

6. A method for a decentralized rideshare service system, comprising:
   generate a driver side user interface (UI) on a first mobile computing device, for a first driver user, wherein the driver side UI is configured to receive user defined rates for offering a rideshare service from the first driver user;
   generating in the driver side user interface (UI), a screen for entry of a plurality of pre-set and different, user defined rideshare offering profiles associated with the first driver user on a single account, wherein the plurality of pre-set and different user defined rideshare offering profiles include,
   a first pre-set user defined rideshare offering profile with a first rideshare service rate, and
   a second pre-set user defined rideshare offering profile with a second rideshare service rate, and wherein
   the pre-set user defined rideshare offering profiles are shown simultaneously in the driver user UI and selectable by the first driver user to indicate availability of a rideshare service under terms of a selected one of the pre-set user defined rideshare offering profiles;
   generating a rider side UI on a second mobile computing device, wherein the first mobile computing device and the second mobile computing device are connected together wirelessly through a decentralized computing network system in a peer-to-peer connection, wherein the decentralized computing network system includes a plurality of mobile computing devices including copies of the computer program product;
   receiving, from the second mobile computing device, a rideshare request from a rider user;

locating one or more available driver users through the decentralized computing network system;

displaying a list of profiles of the one or more available driver users to the rider user, including a profile of the first driver user showing the first driver user's user defined rates; and receiving a selection, through the rider side UI screen on the second mobile computing device, of the one or more available driver users.

7. The method of claim 6, wherein the driver side UI is configured to receive user defined tags of features associated with the rideshare service from the first driver user.

\* \* \* \* \*